United States Patent Office 2,968,145
Patented Jan. 17, 1961

2,968,145

MONOPROPELLENT FOR USE IN ROCKET MOTORS

Irving A. Kanarek, West Los Angeles, Calif., assignor to North American Aviation, Inc.

No Drawing. Filed May 10, 1954, Ser. No. 428,789

9 Claims. (Cl. 60—35.4)

This invention relates to a propellent for use in rocket motors, and in particular, a propellent for use in large rocket motors.

It is customary in rocket applications to utilize two or more separate propellents which, when mixed in a combustible mixture within a combustion chamber of a rocket motor, are ignited. It has, for instance, been proposed to use liquid fluorine as an oxidizer for one of a number of fuels. When two propellents are used, it is necessary to empty the separate propellent tanks concurrently because a severe performance penalty is exacted if a quantity of one or the other propellent remains unconsumed. Many rocket engines are cooled by regenerative cooling wherein the fuel is used as the coolant. In a bi-propellent system, therefore, a portion of the entire quantity of propellent, i.e., the fuel portion, is used for regenerative cooling. A bi-propellent fuel system requires two propellent pumps. This invention contemplates a single propellent of a miscible mixture of oxidizer and fuel which is stable at storage temperature but is combustible at the temperatures and pressures which occur in the combustion chamber of a rocket engine. With the monopropellent of this invention, the entire quantity of propellent can be pumped by one pump and can be used for regeneratively cooling the rocket chamber. Because the monopropellent is properly mixed in approximately stoichiometric proportions before it is placed within the airframe of a rocket, all of the propellent is utilized to provide propulsion energy to the rocket. Because only only fluid is used, only one propellent pump is required.

It is therefore an object of this invention to provide a monopropellent for use in rocket engines.

It is another object of this invention to provide a monopropellent which is stable at storage temperatures and pressures but which is readily combustible at the temperatures and pressures which occur in the combustion chamber of a rocket engine.

It is another object of this invention to provide a monopropellent which can be used to cool regeneratively a rocket engine.

It is a further object of this invention to provide a monopropellent which is entirely consumed during the flight of an airframe which utilizes rocket propulsion systems.

An additional object of this invention is to provide a method of regeneratively cooling and fueling a rocket motor with a single propellent.

Other objects of invention will become apparent from the following description.

The monopropellent mixture of this invention basically comprises a mixture of a stable, inert, non-organic fluorine compound in which the fluorine is still capable of oxidation with a fuel, and a fluorinated organic fuel which is miscible with the non-organic fluorine compound and inert to said oxidizing fluorine compound until ignition of the mixture in the combustion chamber of the rocket engine. In the instant specification and claims the term "inert" is used to connote that no combustion will take place between the fuel and oxidizing components of the mixture prior to actual ignition in the combustion chamber of the motor.

Among the stable, inert, non-organic fluorine compounds usable in this invention are fluorine monoxide, sometimes designated oxygen bifluoride, nitrogen trifluoride, and mixtures thereof. The fluorinated organic fuels may generally be described as fluorinated lower alkyl hydrocarbons, such as the fluoropropanes and fluoromethanes. Specifically, such lower alkyl hydrocarbons as 1-fluoropropane, monofluoromethane, difluoromethane, 1–3 difluoropropane, and 1–1 difluoropropane are usable in the instant mixtures.

The monopropellents described herein when subjected to combustion chamber pressures and temperatures do not vaporize while being used as a regenerative coolant. Thus, the monopropellent enters the combustion chamber as a liquid as is desired in a high performance rocket engine.

The following examples show two typical formulations usable in this invention:

| Oxidizer | Fuel | Ratio, # Ox./# Fuel | $I_{sp}$, sec. | $d$, gm./cc. | Performance Parameter |
|---|---|---|---|---|---|
| $F_2O$ | 1-Fluoropropane | 2.6 | 291 | 1.21 | 1.54 |
| $F_2O$ | Monofluoromethane | 1.6 | 284 | 1.17 | 1.43 | where $I_{sp}$ is the theoretical specific thrust (frozen equilibrium and optimum expansion) in seconds, $d$ is the propellent bulk density and the performance parameter is a comparison with the liquid oxygen—75% ethyl alcohol propellent combination taken as 1.00. This parameter is an estimated range parameter found by the equation:

$$(I_{sp}d^{0.3})^2/(I_{sp}d^{0.3})^2$$

for 75% ethyl alcohol-liquid oxygen.

In the first mentioned formulation, the fuel portion of the monopropellent contains 56% fluorine by weight while in the latter example the fluorine content of the fuel is 31%. The percentage of monofluoromethane in the latter monopropellent is 38.5%. The fuel component of the 1-fluoropropane-$F_2O$ system has a liquid range of from −254° to plus 37° F. which helps the regenerative cooling of the rocket motor.

It has been determined that the ratio of pounds of oxidizer to pounds of fuel in the above typical formulations may vary from 1.8 to 4.0 and 1.0 to 3.5, respectively.

The monopropellent of this invention has the advantages, when used in a rocket engine, that all of the propellent is efficiently used, is pumped by only one pump, and that all of it can be used to regeneratively cool the rocket engine.

Although the invention has been described and illustrated in detail, it is to be clearly understood that the same is by way of illustration and example only and is not to be taken by way of limitation, the spirit and scope of this invention being limited only by the terms of the appended claims.

This application in part discloses and claims subject matter disclosed in my pending application, Serial No. 344,185, filed March 23, 1953, and now abandoned.

I claim:

1. The method of fueling a rocket engine combustion chamber comprising flowing a monopropellent consisting essentially of a miscible mixture of a liquid fluorine compound selected from the class consisting of fluorine monoxide, nitrogen trifluoride and mixtures thereof, as an oxidizer component and an approximately stoichiometric proportion of a liquid fluorinated saturated lower alkyl hydrocarbon as a fuel component into the combustion chamber and igniting said miscible mixture.

2. The invention of claim 1 wherein the fluorinated hydrocarbon fuel is a fluoromethane.

3. The invention of claim 1 wherein the fluorinated hydrocarbon fuel is a fluoropropane.

4. A monopropellent consisting essentially of a miscible mixture of a liquid oxidizer chosen from the class consisting of nitrogen trifluoride, fluorine monoxide and mixtures thereof, and an approximately stoichiometric proportion of a liquid fluorinated saturated lower alkyl hydrocarbon fuel.

5. A monopropellent consisting essentially of a miscible mixture of an oxidizer chosen from the class consisting of nitrogen trifluoride, fluorine monoxide and mixtures thereof, and a fuel chosen from the class consisting of fluoromethanes and fluoropropanes, the ratio of oxidizer to fuel being from 1.0–4.0.

6. A monopropellent for use in rocket engines consisting essentially of a miscible mixture of fluorine monoxide and a liquid fluorinated saturated lower alkyl hydrocarbon, the ratio of oxidizer to fuel being from 1.0–4.0.

7. The invention of claim 6 wherein the fluorinated hydrocarbon is 1-fluoropropane.

8. The invention of claim 6 wherein the fluorinated hydrocarbon is monofluoromethane.

9. A monopropellent for use in rocket engines consisting essentially of a miscible mixture of nitrogen trifluoride and a liquid fluorinated saturated lower alkyl hydrocarbon, the ratio of oxidizer to fuel being from 1.0–4.0.

References Cited in the file of this patent

Journal of the American Rocket Society, No. 72, December 1947, pages 12, 21, 41, 42.

Thompson: Annual Report of the British Interplanetary Society (1952), pages 333–341.

Rosenberg et al.: Ind. & Eng. Chem., vol. 45, No. 10, October 1953, pages 2283–2286.